United States Patent [19]

Langley, Jr.

[11] Patent Number: 4,495,543

[45] Date of Patent: Jan. 22, 1985

[54] ACCUMULATOR

[76] Inventor: David T. Langley, Jr., 226 S. Main St., Los Angeles, Calif. 90012

[21] Appl. No.: 551,837

[22] Filed: Nov. 15, 1983

[51] Int. Cl.³ .......................... H01G 4/00; H02J 3/32
[52] U.S. Cl. ...................................... 361/301; 307/46
[58] Field of Search .................. 307/46; 361/433, 301, 361/312, 314, 315, 279, 326

[56] References Cited

U.S. PATENT DOCUMENTS

| | | | |
|---|---|---|---|
| 926,164 | 6/1909 | Bliss | 361/433 X |
| 1,956,368 | 4/1934 | Wilde | 361/326 |
| 2,438,931 | 4/1948 | Litton | 361/279 |
| 4,287,465 | 9/1981 | Godard et al. | 307/46 X |

Primary Examiner—Donald Griffin
Attorney, Agent, or Firm—Matthew L. Ajemna

[57] ABSTRACT

Apparatus (10, 110) for smoothing energy received from an intermittent source (12, 112), such as a solar energy collector, employs an enclosure (14, 114) functioning as a smoothing and storing capacitor. An energy cell (20, 120) is provided for feeding electrical energy to the enclosure when the source of intermittent energy is unable to do so, with the energy cell being charged by the intermittent source when energy from the latter accedes a predetermined value by use of an appropriate regulator (32, 132).

8 Claims, 4 Drawing Figures

U.S. Patent        Jan. 22, 1985        4,495,543
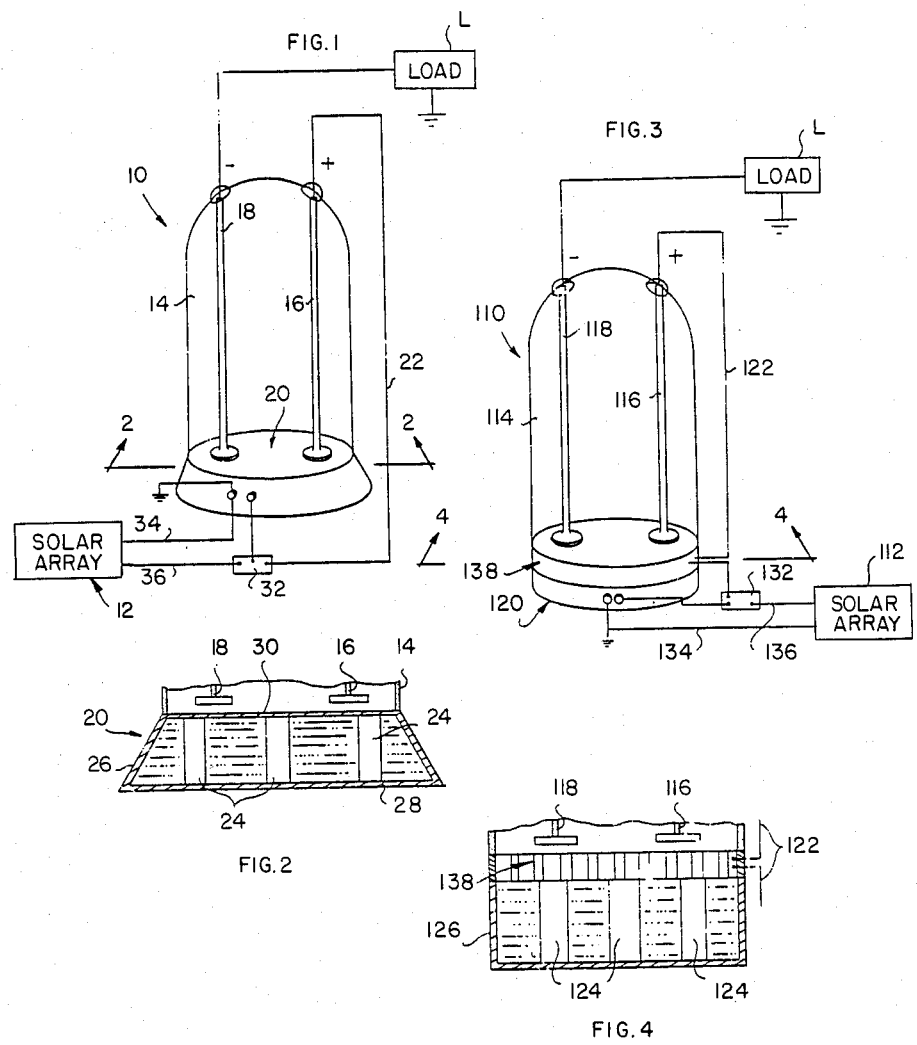

ACCUMULATOR

BACKGROUND OF THE INVENTION

1. Field of the Invention

This invention relates generally to electric energy accumulators, and more particularly to an accumulator for smoothing energy received from intermittent or variable sources.

2. Description of the Prior Act

A problem arises with the use of solar energy, and the like, in that such energy is often intermittent and/or variable in nature requiring some manner of storing and smoothing the collected energy prior to its being dispensed.

Various devices have been proposed for accumulating electrical energy. For example, U.S. Pat. No. 674,437, issued May 21, 1901 to A. Palencsar, discloses apparatus including a tethered balloon for collecting atmospheric electricity. Once collected, the electricity is conducted to an accumulator or accumulators after being regulated by a rheostatic device comprising a "bell-jar" switch. Further, U.S. Pat. No. 685,958, issued Nov. 5, 1901, to N. Telsa, discloses the use of radiant energy, as from the sun, by having it impinge the positive plate of a condenser, or capacitor, while U.S. Pat. No. 761,090, issued May 31, 1904, to I. Mosciciki, discloses a condenser construction including a tubular glass shell closed at a one end and having a narrow passage at the other end. Thickness of the shell varies to absorb tension imparted to it.

U.S. Pat. No. 792,443, issued June 13, 1905, to J. Morwitz, discloses a condenser formed by a plurality of concentric sleeves, while U.S. Pat. No. 1,139,976, issued May 18, 1915, to A. N. Hovland, discloses a leyden jar construction in which each jar is a dome, cylinder, or no more than a hemisphere in in order to permit nesting of parallel jars.

U.S. Pat. No. 1,956,368, issued Apr. 24, 1934, to K. Wilde, discloses a wired-wireless system in which energy is fed into a transmitter or receiver by a condenser which includes a glass envelope having a pair of cylindrical electrodes disposed within it.

U.S. Pat. No. 2,454,102, issued Nov. 16, 1948, to J. D. Stacy, discloses a capacitor which is gas filled; the gas forming the dielectric, while U.S. Pat. No. 2,486,964, issued Nov. 1, 1949, to M. E. Miller discloses an electrical accumulator having a glass shell and partition, and containing a powdered material capable of receiving an electrical charge.

SUMMARY OF THE INVENTION

It is an object of the present invention to provide an accumulator specially suited for storing and smoothing electrical energy from an intermittent and/or variable source, such as solar energy collectors.

It is another object of the present invention to provide an accumulator for electrical energy which is of simple yet reliable construction, and capable of storing electrical energy within precise limits.

Yet another object of the present invention is to provide apparatus for storing and smoothing electrical energy received from an intermittent and/or variable energy source.

These and other objects are achieved, according to the present invention, by providing apparatus comprising an enclosure arranged for retaining energy in the form of electrical charges, and first and second electrodes arranged extending into the enclosure and connected to a source of intermittent energy and to a load, respectively, for creating plates of a capacitor. The enclosure preferably contains an inert gas, such as neon, selected to function as a dielectric up to a break-down voltage of the gas.

An energy cell preferably is associated with the enclosure and connected to the first electrode for selectively supplying electrical energy to the enclosure whenever energy received from a solar energy collecting apparatus, and the like, is insufficient or absent to cause an output from the second electrode to ground. A suitable, known regulator is arrangeable for selectively passing an electrical current to the first electrode from one of the energy cells and a source of intermittent energy.

A transformer can be electrically inserted between the aforementioned regulator and the first electrode in series for stepping-up a voltage received from the regulator in order to match an output voltage to the first electrode as necessary for proper operation of the accumulator according to the present invention.

It is an advantage of the present invention that electrical energy received from an intermittent and/or variable source can be stored and smoothed for efficient use.

It is another advantage of the present invention that electrical energy can be accumulated in a simple manner for use as desired.

BRIEF DESCRIPTION OF THE DRAWINGS

FIG. 1 is a diagrammatic, perspective view showing a first embodiment of accumulator apparatus according to present invention.

FIG. 2 is an enlarged, fragmentary, diagrammatic, sectional view taken generally along the line 2—2 of FIG. 1.

FIG. 3 is a diagrammatic, perspective view, similar to FIG. 1, but showing a second embodiment of accumulator apparatus according to present invention.

FIG. 4 is an enlarged, fragmentary, diagrammatic, sectional view taken generally along the line 4—4 of FIG. 3.

DESCRIPTION OF THE PREFERRED EMBODIMENT

Referring now more particularly to FIGS. 1 and 2 of the drawings, an apparatus 10 for smoothing energy received from an intermittent source 12, such as a solar energy collector or collectors comprises an enclosure 14 arranged for retaining energy in the form of electrical charges. Arranged extending into enclosure 14 is a first electrode 16 connected to source 12 of intermittent energy for creating a first plate of a capacitor. A second electrode 18, similar to electrode 16, also is associated with the enclosure 14, and is connected to a suitable load L for creating a second plate of a capacitor.

Enclosure 14 preferably is fluid tight, having a base to be described below, and contains an inert gas selected to function as a dielectric up to a break-down voltage of the selected gas. One gas which is considered suitable for the purpose is neon.

An energy cell 20 is associated with enclosure 14, preferably being arranged forming base for enclosure 14 as illustrated, and is connected to first electrode 16 as by the illustrated wire 22 for selectively supplying electrical energy to the enclosure 14. Energy cell 20 is constructed in a conventional manner to include a plurality of plates 24 immersed in a suitable electrolyte solution, and encased in a housing formed by a side wall 26 generally in the form of a truncated cone and having a bottom wall 28 and a top wall 30. As can be appreciated from the drawing, top wall 30 forms a bottom to enclosure 14, with energy cell 20 itself forming a supporting base for enclosure 14, as mentioned above.

A regulator 32 is disposed electrically between source 12, energy cell 20, and first electrode 16, for selectively passing an electrical current to electrode 16 from one of source 12 and energy cell 20 by the illustrated wires 34, 36 respectively. Regulator 32, which is of conventional construction, functions both to supply electrical energy to electrode 16 when inadequate energy is being received from source 12, and to charge energy cell 20 in a known manner when a predetermined amount of electrical energy is being received from the source 12.

Referring now to FIGS. 3 and 4 of the drawing, an apparatus 110 similar to apparatus 10 but with an additional feature will now be described. This apparatus 110 is associated with a source 112 similar to source 12, and comprises an enclosure 114 having associated therewith electrodes 116 and 118, all of which is also similar to enclosure 14, and electrodes 16 and 18. Further, enclosure 114 can be filled with an inert gas, such as neon, to serve as a dielectric. Forming a base for enclosure 114 is an energy cell 120 similar to cell 20 and connected to electrode 116 as by a suitable wire 122. Like energy cell 20, cell 120 is formed by a plurality of plates 124 immersed in a suitable electrolyte and is formed by a generally cylindrical wall 126 and cooperating bottom and top walls 128 and 130, respectively.

A regulator 132 similar to regulator 32 is connected to source 112 and electrode 116 as by the respective wires 134 and 136 so as to function in the manner described above for regulator 32.

Disposed between energy cell 120 and enclosure 114, so as to partially form a base for enclosure 114, is a transformer 138 electrically connected in series with electrode 116 of enclosure 114, and with the regulator 132, for stepping-up a voltage received from the regulator 132. The purpose for increasing the voltage is to facilitate a break-down, or cross-over, of a current between the electrodes 116 and 118.

By using an annular configuration for transformer 138, the latter can be constructed to conform with energy cell 120 and partially form a base for the enclosure 114, as mentioned above.

OPERATION

As can be appreciated from the above description and from the drawing, apparatus according to present invention, can be employed for smoothing electrical energy received from an intermittent source, such as a solar energy collector, by feeding an intermittent voltage to a capacitor formed by electrodes 16, 18 and 116, 118. Once a charge on electrode 16, 116 is at a value above a break-down voltage of the resulting capacitor, current will flow to an electrode 18, 118 and out to a grounded load L as desired. The use of an inert gas, such as neon or argon, increases the break-down voltage within enclosure 14, 114, so as to assure a suitable build up of energy within the capacitor, with a transformer 138 being insertable in the circuit for stepping-up an incoming signal to a value determined by the break-down characteristics of the associated apparatus.

It is to be understood that the above description of the present invention is capable of various changes, modifications, and adaptions, and such are intended to be included within the meaning and range of equivalence of the following claims.

I claim:

1. Apparatus for smoothing energy received from an intermittent source, such as a solar energy collector, comprising, in combination:
    (a) enclosure means for retaining energy in the form of electrical charges;
    (b) first electrode means arranged extending into the enclosure means and connected to a source of intermittent energy for creating a first plate of a capacitor;
    (c) second electrode means associated with the enclosure means and connectible to a load for creating a second plate of a capacitor, the enclosure means containing an inert gas selected to function as a dielectric up to a break-down voltage of the gas; and
    (d) an energy cell means associated with the enclosure means and connected to the first electrode means for selectively supplying electrical energy to the enclosure means.

2. Apparatus as defined in claim 1 wherein the inert gas is neon.

3. Apparatus as defined in claim 1, wherein the energy cell is arranged forming a base for the enclosure means.

4. Apparatus as defined claim 3, further including an energy cell means associated with the enclosure means and connected to the first electrode means for selectively supplying electrical energy to the enclosure means.

5. Apparatus as defined in claim 4, wherein the transformer means is arranged between the enclosure means and the energy cell means for cooperating with the latter and partially forming the base for the enclosure means.

6. Apparatus as defined in claim 1, further including regulator means for selectively passing an electrical current to the first electrode means from at least one of a source of intermittent energy and the energy cell means.

7. Apparatus as defined in claim 6, further including transformer means electrically connected in series with the enclosure means and the regulator means for stepping-up a voltage received from the regulator means.

8. Apparatus as defined in claim 7, wherein the transformer means is arranged between the enclosure means and the energy cell means for cooperating with the latter and partially forming the base for the enclosure means.

* * * * *